US009432474B2

United States Patent
Li

(10) Patent No.: US 9,432,474 B2
(45) Date of Patent: *Aug. 30, 2016

(54) CONTROL METHOD, CONTROL DEVICE, AND PROCESSOR IN SOFTWARE DEFINED NETWORK

(71) Applicant: Huawei Technologies Co., Ltd., Shenzhen (CN)

(72) Inventor: Yi Li, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 14/706,619

(22) Filed: May 7, 2015

(65) Prior Publication Data

US 2015/0244824 A1    Aug. 27, 2015

Related U.S. Application Data

(63) Continuation of application No. 14/520,572, filed on Oct. 22, 2014, which is a continuation of application No. PCT/CN2013/088609, filed on Dec. 5, 2013, now Pat. No. 9,344,511.

(51) Int. Cl.
*G06F 15/16* (2006.01)
*H04L 29/08* (2006.01)
(Continued)

(52) U.S. Cl.
CPC ..... *H04L 67/2804* (2013.01); *H04L 29/08072* (2013.01); *H04L 41/0233* (2013.01);
(Continued)

(58) Field of Classification Search
USPC ............... 709/217–218, 203, 223–229, 250
See application file for complete search history.

(56) References Cited

U.S. PATENT DOCUMENTS

2010/0202450 A1* 8/2010 Ansari .............. G06Q 30/04
370/389
2010/0241748 A1* 9/2010 Ansari .............. G06Q 30/04
709/225
(Continued)

FOREIGN PATENT DOCUMENTS

CN        1705279 A      12/2005
CN      103209121 A       7/2013
(Continued)

OTHER PUBLICATIONS

Nadeau, T., Ed., et al., "Framework for Software Defined Networks," draft-nadeau-sdn-framework-01, Oct. 31, 2011, 10 pages.
(Continued)

*Primary Examiner* — Zarni Maung
(74) *Attorney, Agent, or Firm* — Conley Rose, P.C.; Grant Rodolph

(57) ABSTRACT

A control method, a control device, and a processor in a software defined network (SDN). In the control method, the control device, and the processor in the SDN provided by the embodiments of the present invention, location information of a network device registered in another control device in the SDN is obtained, so that a remote object proxy of the network device can be established according to the location information, and the network device is controlled using the remote object proxy. Therefore, it is unnecessary to send a control or operation request to device objects of all network devices in other control devices, thereby avoiding a step that the device objects of all the network devices in the other control devices receive a service control request and perform determining, and improving service processing performance.

15 Claims, 6 Drawing Sheets

(51) Int. Cl.
H04L 12/26 (2006.01)
H04L 12/24 (2006.01)
G06F 12/00 (2006.01)

(52) U.S. Cl.
CPC ....... *H04L41/0803* (2013.01); *H04L 41/0853* (2013.01); *H04L 41/12* (2013.01); *H04L 43/10* (2013.01); *H04L 67/025* (2013.01); *H04L 67/18* (2013.01)

(56) References Cited

U.S. PATENT DOCUMENTS

| | | | |
|---|---|---|---|
| 2012/0250496 A1 | 10/2012 | Kato | |
| 2013/0031601 A1* | 1/2013 | Bott | G06F 21/552 726/1 |
| 2013/0132854 A1* | 5/2013 | Raleigh | G06F 3/0482 715/738 |
| 2013/0250770 A1 | 9/2013 | Zou et al. | |
| 2013/0266007 A1 | 10/2013 | Kumbhare et al. | |
| 2013/0268686 A1 | 10/2013 | Wang et al. | |
| 2014/0362713 A1* | 12/2014 | Agarwal | H04W 48/04 370/252 |
| 2015/0163314 A1* | 6/2015 | Li | H04L 67/18 709/217 |
| 2015/0172941 A1* | 6/2015 | Agarwal | H04W 48/04 370/253 |
| 2015/0237008 A1* | 8/2015 | Ansari | H04L 63/02 726/1 |

FOREIGN PATENT DOCUMENTS

| | | |
|---|---|---|
| EP | 1420340 A1 | 5/2004 |
| EP | 2784993 A1 | 10/2014 |
| JP | 2010045503 A | 2/2010 |
| JP | 2012195807 A | 10/2012 |
| WO | 2011065268 A1 | 6/2011 |
| WO | 2012073406 A1 | 6/2012 |
| WO | 2014133025 A1 | 9/2014 |

OTHER PUBLICATIONS

Foreign Communication From a Counterpart Application, European Application No. 13882059.2, Extended European Search Report dated Jul. 7, 2015, 11 pages.

Foreign Communication From a Counterpart Application, PCT Application No. PCT/CN2013/088609, International Search Report dated Sep. 4, 2014, 7 pages.

Foreign Communication From a Counterpart Application, PCT Application No. PCT/CN2013/088609, Written Opinion dated Sep. 4, 2014, 5 pages.

Koide, T., et al., "A consideration on large-scale OpenFlow networks using Source Flow based technique," The Institute of Electronics, Information and Commmunication Engineers, IEICE Technical Report, NS2010-221, Mar. 2011, 7 pages.

Foreign Communication From a Counterpart Application, Japanese Application No. 2015551107, Japanese Notice of Allowance dated Dec. 8, 2015, 3 pages.

* cited by examiner

CONTROL METHOD, CONTROL DEVICE, AND PROCESSOR IN SOFTWARE DEFINED NETWORK

CROSS-REFERENCE TO RELATED APPLICATIONS

This application is a continuation of U.S. patent application Ser. No. 14/520,572, filed on Oct. 22, 2014, which is a continuation of International Application No. PCT/CN2013/088609, filed on Dec. 5, 2013. The afore-mentioned patent applications are hereby incorporated by reference in their entireties.

TECHNICAL FIELD

The present invention relates to the field of information technologies, and in particular, to a control method, a control device, and a processor in a software defined network (SDN).

BACKGROUND

An SDN is a new type of innovative network architecture, and a core technology OpenFlow thereof separates a control plane of a network device from a data plane, so as to implement flexible control over network traffic and provide a good platform for innovation of a core network and applications.

In an SDN network, each network device only retains a forwarding function, and all control functions are centralized in a controller. The SDN network includes a host, a forwarding device, and a controller. The host is a network endpoint, and is an initiator a terminator of communication; the forwarding device is responsible for sending a data packet, and has no independent control plane and shares a centralized control plane (that is, the controller in the SDN) with other devices; and the controller is a control center in the SDN, and is responsible for controlling and managing the forwarding device. When communication is performed between hosts, a communications channel is obtained by computation of the controller instead of negotiation of the forwarding device, and is delivered to each forwarding device.

The controller in the SDN implements control and management using software modules such as a software logic, a north bound interface, a Network Operating System (NOS), and a south bound interface. The control logic is a network application program or service, and interacts with the NOS using the North Bound Interface (NBI), so that the NOS controls the forwarding device through the South Bound Interface (SBI), thereby implementing functions, such as data forwarding, required by the control logic.

In the prior art, if a link is required to be established between two hosts that are registered in different controllers, it is necessary to use two switching devices, which are separately registered in different control devices, to perform an operation. When one controller needs to perform an operation for a host under the other control device, the operation is implemented using a broadcast mechanism such as subscription/notification, and all switching devices under the other control device may receive an event request and perform determining, resulting in low performance of service processing.

SUMMARY

Embodiments of the present invention provide a control method, a control device, and a processor in a SDN, which solve a problem in the prior art that performance for processing a service between network devices under different control devices is not high.

An embodiment of the present invention provides a control device in a SDN, where the control device includes an operating system running in the control device, and the operating system includes a service processing module, an object obtaining module, and an object storage module, where the object obtaining module is configured to obtain location information of a requested network device from the object storage module according to a request of the service processing module, where the network device is registered in another control device in the SDN; the service processing module is configured to establish a remote object proxy of the network device according to the location information of the network device, and control the network device using the remote object proxy, where the remote object proxy is a proxy of a device object of the network device in the control device, and the device object is a proxy of the control device where the network device is registered for controlling the network device; and the object storage module is configured to store the location information of the network device, where the location information of the network device includes a device identity (ID) of the control device where the network device is registered, an Internet Protocol (IP) address of the control device where the network device is registered, and a device ID of the network device.

Optionally, the object obtaining module is further configured to obtain remote object information of the network device according to the location information of the network device, and establish the remote object proxy of the network device using the remote object information of the network device, where the remote object information of the network device is information of performing remote control over the network device.

Optionally, the object storage module is further configured to share location information of a network device registered in the control device with other control devices in the SDN, where the location information of the network device registered in the control device includes a device ID of the control device, an IP address of the control device, and a device ID of the network device registered in the control device.

Optionally, that the object storage module shares location information of a network device registered in the control device with other control devices in the SDN includes sending, by the object storage module, the location information of the network device registered in the control device to a shared device in the SDN, where the shared device stores location information of network devices in the SDN.

Optionally, the shared device is an independent device, or is integrated in the control device, or is integrated in another control device in the SDN.

Optionally, the object storage module is further configured to obtain, from the shared device, location information of network devices registered in the other control devices in the SDN network, and store the location information into the object storage module.

Optionally, that the object storage module shares location information of a network device registered in the control device with other control devices in the SDN includes broadcasting, by the object storage module, the location information of the network device registered in the control device to the other control devices in the SDN.

Optionally, the object storage module is further configured to obtain, from the other control devices in the SDN, location information of network devices registered in the other control devices in the SDN network, and store the location information into the object storage module.

Optionally, the control device further includes an operation interface module, where the operation interface module is configured to create at least two operation interfaces for the device object of the network device registered in the control device, where the at least two operation interfaces have an inheritance relationship in operation content.

Optionally, the at least two operation interfaces created by the operation interface module include an operation interface applicable to at least two network devices registered in the control device, and an operation interface only applicable to one network device registered in the control device.

Optionally, the operation interfaces set operation manners for the network devices registered in the control device.

Optionally, the control device further includes a monitoring module and a driver management module, where the monitoring module is configured to receive a registration request initiated by the network device registered in the control device, where the registration request carries a feature code, and send the feature code to the driver management module, where the feature code is used to uniquely identify the network device that initiates the registration request; and the driver management module is configured to establish, according to the feature code, a mapping relationship between a driver of the network device registered in the control device and the feature code.

Optionally, the monitoring module is further configured to receive a connection request initiated by the network device registered in the control device, where the connection request carries the feature code; and the driver management module is further configured to obtain, according to the feature code carried in the connection request, the driver of the network device registered in the control device.

Optionally, the feature code includes at least one of a product number, a version number, or a producer number of the network device.

An embodiment of the present invention further provides a control method in a SDN, where the method includes receiving, by a control device in the SDN, a service request; obtaining, by the control device, location information of a network device for processing the service of the service request, where the network device is registered in another control device in the SDN, and the location information of the network device includes a device ID of the control device where the network device is registered, an IP address of the control device where the network device is registered, and a device ID of the network device; establishing, by the control device, a remote object proxy of the network device according to the location information of the network device; and controlling, by the control device, the remote object proxy according to the service request, where the remote object proxy is a proxy of a device object of the network device in the control device, and the device object is a proxy of the control device where the network device is registered for controlling the network device.

Optionally, the establishing a remote object proxy of the network device according to the location information of the network device includes obtaining remote object information of the network device according to the location information of the network device, and establishing the remote object proxy of the network device using the remote object information of the network device, where the remote object information of the network device is information of performing remote control over the network device.

Optionally, the method further includes sharing location information of a network device registered in the control device with other control devices in the SDN, where the location information of the network device registered in the control device includes a device ID of the control device, an IP address of the control device, and a device ID of the network device registered in the control device.

Optionally, the sharing location information of a network device registered in the control device with other control devices in the SDN includes sending the location information of the network device registered in the control device to a shared device in the SDN, where the shared device stores location information of network devices in the SDN.

Optionally, the shared device is an independent device, or is integrated in the control device, or is integrated in another control device in the SDN.

Optionally, the method further includes obtaining, from the shared device, location information of network devices registered in the other control devices in the SDN network, and storing the location information into an object storage module.

Optionally, the sharing location information of a network device registered in the control device with other control devices in the SDN includes broadcasting the location information of the network device registered in the control device to the other control devices in the SDN.

Optionally, the method further includes obtaining, from the other control devices in the SDN, location information of network devices registered in the other control devices in the SDN network, and storing the location information into the object storage module.

Optionally, the method further includes creating at least two operation interfaces, where the at least two operation interfaces have an inheritance relationship in operation content, and the operation interfaces set operation manners for network devices registered in the control device.

Optionally, the at least two operation interfaces include an operation interface applicable to at least two network devices registered in the control device, and an operation interface only applicable to one network device registered in the control device.

Optionally, the method further includes setting a monitoring module in the control device, where the monitoring module receives a registration request initiated by the network device registered in the control device, where the registration request carries a feature code, and sending the feature code to a driver management module in the control device, where the feature code is used to uniquely identify the network device that initiates the registration request; and establishing, by the driver management module, according to the feature code, a mapping relationship between a driver of the network device registered in the control device and the feature code.

Optionally, the method further includes receiving, by the monitoring module, a connection request initiated by the network device registered in the control device, where the connection request carries the feature code; and obtaining, by the driver management module, according to the feature code carried in the connection request, the driver of the network device registered in the control device.

Optionally, the feature code includes at least one of a product number, a version number, or a producer number of the network device.

An embodiment of the present invention further provides a processor in a SDN, where the processor is located in the control device in the SDN, and the processor is configured to perform the following steps: receiving a service request; obtaining location information of a network device for processing a service, where the network device is registered in another control device in the SDN, and the location information of the network device includes a device ID of the control device where the network device is registered, an IP address of the control device where the network device is registered, and a device ID of the network device; establishing a remote object proxy of the network device according to the location information of the network device; and controlling the remote object proxy according to the service request, where the remote object proxy is a proxy of a device object of the network device in the control device, and the device object is a proxy of the control device where the network device is registered for controlling the network device.

Optionally, the establishing a remote object proxy of the network device according to the location information of the network device includes obtaining remote object information of the network device according to the location information of the network device, and establishing the remote object proxy of the network device using the remote object information of the network device, where the remote object information of the network device is information of performing remote control over the network device.

Optionally, the processor is further configured to perform the following step: sharing location information of a network device registered in the control device with other control devices in the SDN, where the location information of the network device registered in the control device includes a device ID of the control device, an IP address of the control device, and a device ID of the network device registered in the control device.

Optionally, the sharing location information of a network device registered in the control device with other control devices in the SDN includes sending the location information of the network device registered in the control device to a shared device in the SDN, where the shared device stores location information of network devices in the SDN.

Optionally, the shared device is an independent device, or is integrated in the control device, or is integrated in another control device in the SDN.

Optionally, the processor is further configured to perform the following step: obtaining, from the shared device, location information of network devices registered in the other control devices in the SDN network, and storing the location information into an object storage module.

Optionally, the sharing location information of a network device registered in the control device with other control devices in the SDN includes broadcasting the location information of the network device registered in the control device to the other control devices in the SDN.

Optionally, the processor is further configured to perform the following step: obtaining, from the other control devices in the SDN, location information of network devices registered in the other control devices in the SDN network, and storing the location information into the object storage module.

Optionally, the processor is further configured to perform the following step: creating at least two operation interfaces, where the at least two operation interfaces have an inheritance relationship in operation content, and the operation interfaces set operation manners for network devices registered in the control device.

Optionally, the at least two operation interfaces include an operation interface applicable to at least two network devices registered in the control device, and an operation interface only applicable to one network device registered in the control device.

Optionally, the processor is further configured to perform the following steps: receiving a registration request initiated by the network device registered in the control device, where the registration request carries a feature code, and the feature code is used to uniquely identify the network device that initiates the registration request; and establishing a mapping relationship between a driver of the network device registered in the control device and the feature code.

Optionally, the processor is further configured to perform the following steps: receiving a connection request initiated by the network device registered in the control device, where the connection request carries the feature code; and obtaining, according to the feature code carried in the connection request, the driver of the network device registered in the control device.

Optionally, the feature code includes at least one of a product number, a version number, or a producer number of the network device.

In the control method, the control device, and the processor in the SDN provided by the embodiments of the present invention, location information of a network device registered in another control device in the SDN is obtained, so that a remote object proxy of the network device can be established according to the location information, and the network device is controlled using the remote object proxy. Therefore, the network device that needs to be controlled or operated can be controlled directly, and it is unnecessary to send a control or operation request to device objects of all network devices in other control devices, thereby avoiding a step that the device objects of all the network devices in the other control devices receive a service control request and perform determining, and improving service processing performance.

BRIEF DESCRIPTION OF DRAWINGS

To describe the technical solutions in the embodiments of the present invention more clearly, the following briefly introduces the accompanying drawings required for describing the embodiments. The accompanying drawings in the following description show merely some embodiments of the present invention, and a person of ordinary skill in the art may still derive other drawings from these accompanying drawings without creative efforts.

DESCRIPTION OF EMBODIMENTS

The following clearly describes the technical solutions in the embodiments of the present invention with reference to the accompanying drawings in the embodiments of the present invention. The described embodiments are a part rather than all of the embodiments of the present invention. All other embodiments obtained by a person of ordinary skill in the art based on the embodiments of the present invention without creative efforts shall fall within the protection scope of the present invention.

Figure 1:
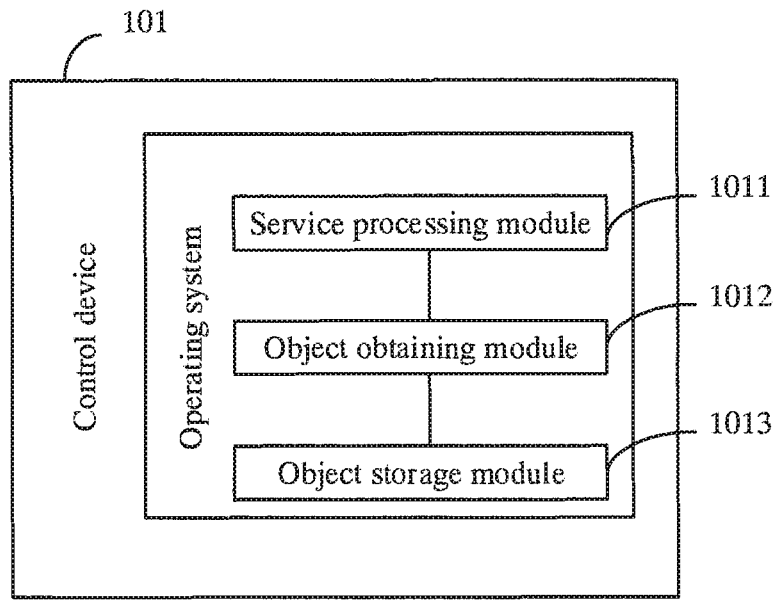
FIG. 1 is a schematic structural diagram of a control device 101 in an SDN according to an embodiment of the present invention.

FIG. 1 is a schematic structural diagram of a control device 101 in a SDN according to an embodiment of the present invention. The control device 101 includes an operating system running in the control device, and the operating system includes a service processing module 1011, an object obtaining module 1012, and an object storage module 1013.

The object obtaining module 1012 is configured to obtain location information of a requested network device from the object storage module 1013 according to a request of the service processing module 1011, where the network device is registered in another control device in the SDN.

The service processing module 1011 is configured to establish a remote object proxy of the network device according to the location information of the network device, and control the network device using the remote object proxy, where the remote object proxy is a proxy of a device object of the network device in the control device, and the device object is a proxy of the control device where the network device is registered for controlling the network device.

The object storage module 1013 is configured to store the location information of the network device, where the location information of the network device includes a device ID of the control device where the network device is registered, an IP address of the control device where the network device is registered, and a device ID of the network device.

In the foregoing control device 101 in an SDN provided by the embodiment of the present invention, the object obtaining module 1012 obtains location information of a network device registered in another control device in the SDN, so that the service processing module 1011 can establish a remote object proxy of the network device according to the location information, and control the network device using the remote object proxy. The control device 101 may directly control the network device that needs to be controlled or operated, and it is unnecessary to send a control or operation request to device objects of all network devices in other control devices, thereby avoiding a step that the device objects of all the network devices in the other control devices receive a service control request and perform determining, and improving service processing performance.

As an optional implementation manner, the object obtaining module 1012 is further configured to obtain remote object information of the network device according to the location information of the network device, and establish the remote object proxy of the network device using the remote object information of the network device, where the remote object information of the network device is information of performing remote control over the network device. Further, the object obtaining module 1012 determines, according to the location information of the network device, the control device where the network device is registered, and can access space that stores a remote object of the network device, and establish the remote object proxy of the network device according to the remote object information of the network device obtained from the space that stores the remote object of the network device, to implement remote control over the device object of the network device.

As an optional implementation manner, the object storage module 1013 is further configured to share location information of a network device registered in the control device with other control devices in the SDN, where the location information of the network device registered in the control device includes a device ID of the control device, an IP address of the control device, and a device ID of the network device registered in the control device.

That the object storage module 1013 shares location information of a network device registered in the control device with other control devices in the SDN includes sending, by the object storage module, the location information of the network device registered in the control device to a shared device in the SDN, where the shared device stores location information of network devices in the SDN; or broadcasting, by the object storage module, the location information of the network device registered in the control device to the other control devices in the SDN.

The shared device may be an independent device, or be integrated in the control device, or be integrated in another control device in the SDN.

Correspondingly, the object storage module 1013 is further configured to obtain, from the shared device, location information of network devices registered in the other control devices in the SDN network, and store the location information into the object storage module; or receive location information of network devices broadcast by the other control devices in the SDN, obtain the location information of the network devices registered in other control devices in the SDN network, and store the location information into the object storage module.

The object storage module 1013 shares location information of a network device registered in the control device with other control devices in the SDN, so that the other control devices in the SDN can obtain the location information of the network device registered in the control device, and so that the other control devices in the SDN can implement remote control over the network device registered in the control device according to the obtained location information. In addition, if the location information of the network device registered in the control device is sent to the shared device in the SDN, the control devices in the SDN can obtain the location information from the shared device when remote control is required, so that space for the object storage module 1013 to store the location information of the other control devices can be saved.

Figure 2:
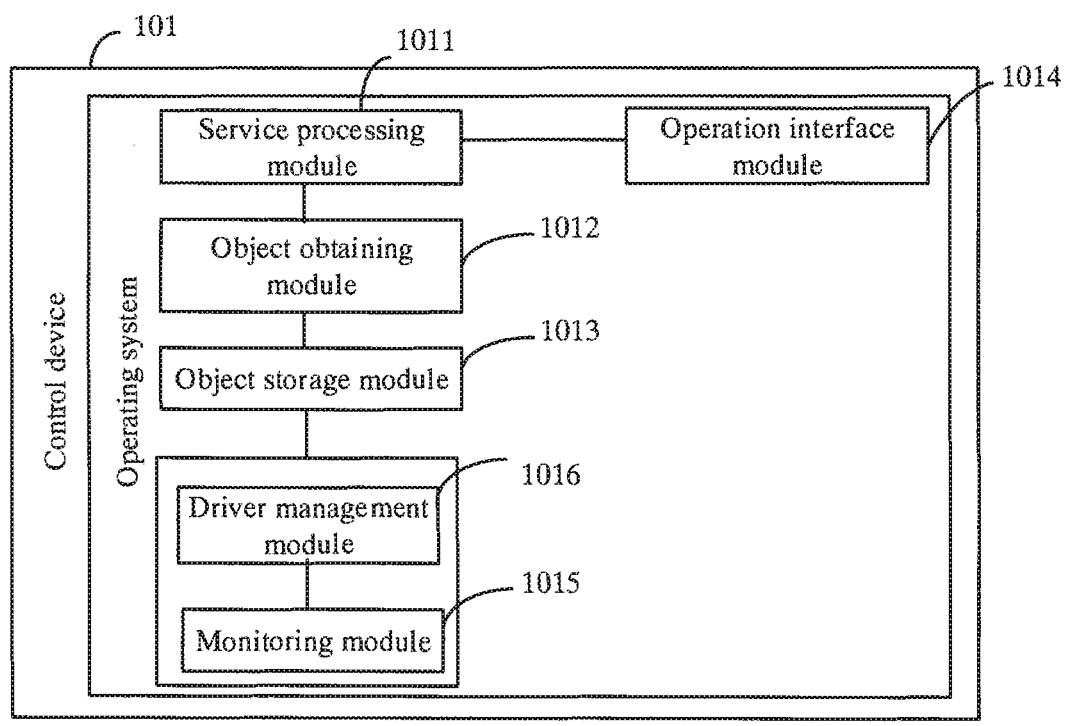
FIG. 2 is a schematic structural diagram of a specific implementation of a control device 101 in an SDN according to an embodiment of the present invention.

FIG. 2 is a schematic structural diagram of a specific implementation of a control device 101 in a SDN according to an embodiment of the present invention. As shown in FIG. 2, the control device 101 further includes an operation interface module 1014.

The operation interface module 1014 is configured to create at least two operation interfaces for the device object of the network device registered in the control device, where the at least two operation interfaces have an inheritance relationship in operation content.

The at least two operation interfaces created by the operation interface module include an operation interface applicable to at least two network devices registered in the control device, and an operation interface only applicable to one network device registered in the control device. The operation interfaces set operation manners for the network devices registered in the control device.

At least two operation interfaces are set, and the operation interfaces have an inheritance relationship in operation content, a flexible configuration for the device object can be implemented, thereby avoiding a disadvantage that a method set by a single operation interface satisfies device objects of all network devices but fails to play properties of specific network devices, or a disadvantage, caused by a single operation interface setting an operation interface for a specific network device, that an implementation is complex and an operation interface is required to be added when a network device is newly added.

As an optional implementation manner, the control device 101 further includes a monitoring module 1015 and a driver management module 1016.

The monitoring module 1015 is configured to receive a registration request initiated by the network device registered in the control device, where the registration request carries a feature code, and send the feature code to the driver management module, where the feature code is used to uniquely identify the network device that initiates the registration request.

The driver management module 1016 is configured to establish, according to the feature code, a mapping relationship between a driver of the network device registered in the control device and the feature code.

Optionally, the monitoring module 1015 is further configured to receive a connection request initiated by the network device registered in the control device, where the connection request carries the feature code.

The driver management module 1016 is further configured to obtain, according to the feature code carried in the connection request, the driver of the network device registered in the control device.

The feature code may include at least one of a product number, a version number, or a producer number of the network device.

In the foregoing implementation manner, the monitoring module 1015 acts as a bridge between the network device and the driver management module 1016, and different network devices are distinguished using feature codes that uniquely identify the network devices, thereby implementing effective control over the network device, and avoiding a problem of failing to distinguish specific network devices because of repeated port numbers when port numbers are used to distinguish different network devices.

A control device in an SDN according to an embodiment of the present invention is described below in detail using that the SDN includes two control devices and one shared device as an example, and that each control device controls two switching devices.

Figure 3:
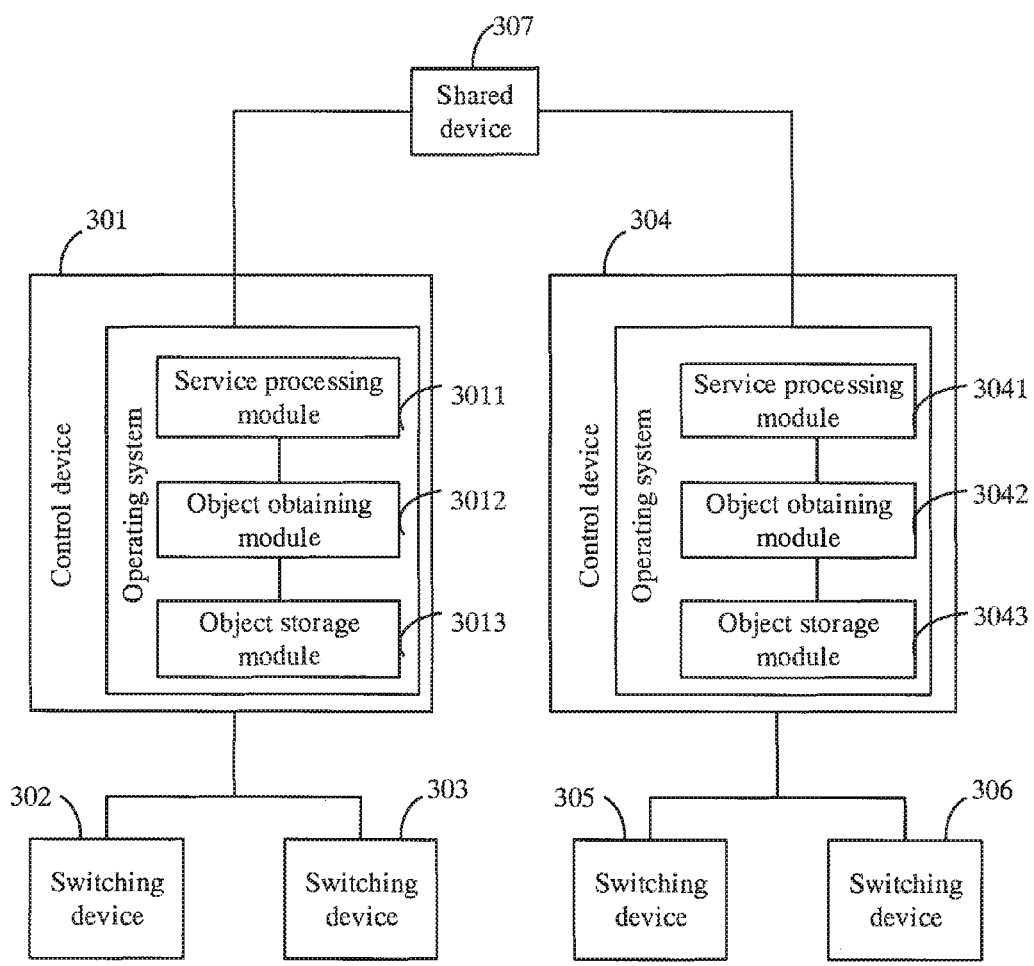
FIG. 3 is a schematic structural diagram of a specific implementation manner of a control device in an SDN according to an embodiment of the present invention.

FIG. 3 is a schematic structural diagram of a specific implementation manner of a control device in an SDN according to an embodiment of the present invention. As shown in FIG. 3, a control device 301 in the SDN is connected to a switching device 302 and a switching device 303, a control device 304 is connected to a switching device 305 and a switching device 306, and the control device 301 and the control device 304 are connected to a shared device 307 separately. An operating system of the control device 301 includes a service processing module 3011, an object obtaining module 3012, and an object storage module 3013. An operating system of the control device 304 includes a service processing module 3041, an object obtaining module 3042, and an object storage module 3043.

The shared device 307 may be accessed by the control device 301 and the control device 304. That is, both the operating system running in the control device 301 and the operating system running in the control device 304 can access content in the shared device 307.

The shared device 307 stores location information of network devices in the SDN where the shared device 307 is located. In this embodiment, the shared device 307 stores location information of the switching device 302, switching device 303, switching device 305, and switching device 306. The shared device 307 usually stores the location information of the network devices in a specific data structure manner, and may store the location information of the switching devices in a structure manner of table or tree structure as long as device IDs of the control devices where the network devices are registered, IP addresses of the control devices where the network devices are registered, and device IDs of the network devices are clearly stored, so that the control device in the SDN can obtain location information of network devices registered in other control devices.

This embodiment is described using that the shared device 307 is an independent hardware device as an example, that the location information of the switching devices is stored in a manner of tree structure, and that the service processing module 3011 in the control device 301 needs to establish a link from the switching device 302 to the switching device 306.

Figure 4:
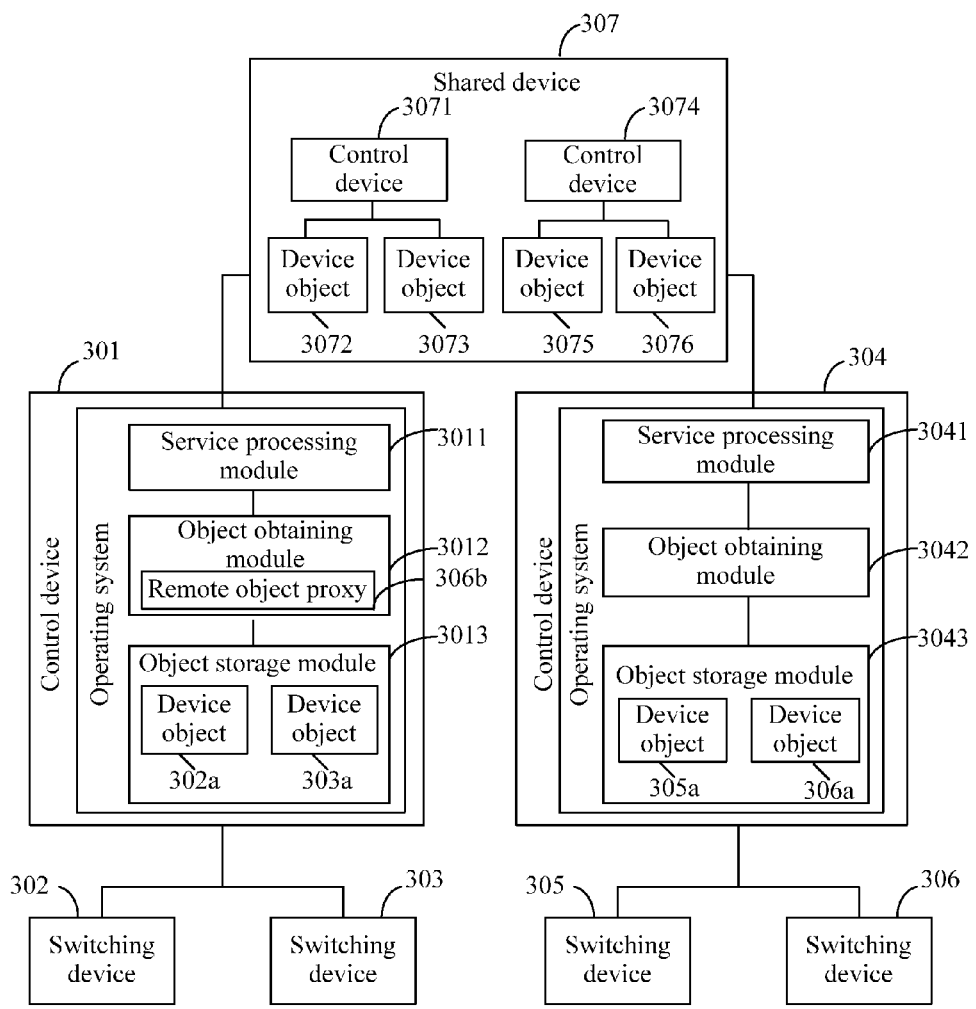
FIG. 4 is a schematic structural diagram of another specific implementation manner of a control device in an SDN according to an embodiment of the present invention.

FIG. 4 is a schematic structural diagram of another specific implementation manner of a control device in an SDN according to an embodiment of the present invention. As shown in FIG. 4, when the control device 301 is started, the object storage module 3013 thereof creates in the shared device 307 a node, that is, a control device 3071, of the control device 301 in a tree data structure, where the control device 3071 represents the control device 301, and the control device 3071 records a device ID and an IP address of the control device 301.

When the switching device 302 and the switching device 303 are connected to the control device 301 for the first time, a driver layer in the control device 301 may create a device object separately for the switching device 302 and the switching device 303, and store the device objects in a device object base of the control device 301. The device object of the switching device is a proxy for the control device to control the switching device, and may be a proxy for the service processing module in the operating system of the control device to perform an operation for the switching object. For example, a device object 302a is a proxy of the switching device 302 in the operating system of the control device 301, a device object 303a is a proxy of the switching device 303 in the operating system of the control device 301, the operating system of the control device 301 controls the switching device 302 using the device object 302a, and the operating system of the control device 301 controls the switching device 303 using the device object 303a. The object storage module 3013 records the device object 302a and the device object 303a, and then creates in the shared device 307 a node, that is, a device object 3072, of the device object 302a, where the device object 3072 records a device ID of the switching device 302; and creates a node, that is, a device object 3073, of the device object 303a, where the device object 3073 records a device ID of the switching device 303.

In this way, tree structure sharing information corresponding to the control device 301, the switching device 302, and the switching device 303 is created in the shared device 307, and the tree structure sharing information records the device ID and the IP address of the control device 301, and device IDs of the switching device 302 and the switching device 303, so that the control device 304 can obtain the foregoing information from the shared device 307, and implement remote control over the switching device 302 or the switching device 303 under the control of the control device 301.

When the control device 304 is started, the object storage module 3043 thereof creates in the shared device 307 a node, that is, a control device 3074, of the control device 304 in a tree data structure, where the control device 3074 represents the control device 304, and the control device 3074 records a device ID and an IP address of the control device 304.

When the switching device 305 and the switching device 306 are connected to the control device 304 for the first time, a driver layer in the control device 304 may create a device object separately for the switching device 305 and the switching device 306, and store the device objects in a device object base of the control device 304. For example, a device object 305*a* is a proxy of the switching device 305 in the operating system of the control device 304, a device object 306*a* is a proxy of the switching device 306 in the operating system of the control device 304, the operating system of the control device 304 controls the switching device 305 using the device object 305*a*, and the operating system of the control device 304 controls the switching device 306 using the device object 306*a*. The object storage module 3043 records the device object 305*a* and the device object 306*a*, and then creates in the shared device 307 a node, that is, a device object 3075, of the device object 305*a*, where the device object 3075 records a device ID of the switching device 305; and creates a node, that is, a device object 3076, of the device object 306*a*, where the device object 3076 records a device ID of the switching device 306.

Tree structure sharing information corresponding to the control device 304, the switching device 305, and the switching device 306 is created in the shared device 307, and the tree structure sharing information records the device ID and the IP address of the control device 304, and device IDs of the switching device 305 and the switching device 306, so that the control device 301 can obtain the foregoing information from the shared device 307, and implement remote control over the switching device 305 or the switching device 306 under the control of the control device 304.

Because the service processing module 3011 needs to establish the link from the switching device 302 to the switching device 306, the service processing module 3011 may obtain the device ID of the switching device 302 and the device ID of the switching device 306. The service processing module 3011 needs to obtain the device object of the switching device 302 according to the device ID of the switching device 302, obtain the device object of the switching device 306 according to the device ID of the switching device 306, and separately implement control over the switching device 302 and control over the switching device 306 by performing an operation and control for the device object of the switching device 302 and the device object of the switching device 306.

The service processing module 3011 obtains the device object of the switching device 302 from the object obtaining module 3012 according to the device ID of the switching device 302. The object obtaining module 3012 requests the device object of the switching device 302 from the object storage module 3013 according to the device ID of the switching device 302. Because the switching device 302 is registered in the control device 301, the object storage module 3013 may store the device object 302*a* of the switching device 302. The object storage module 3013 obtains the device object 302*a* of the switching device 302 according to the device ID of the switching device 302, and returns the device object 302*a* to the object obtaining module 3012. The object obtaining module 3012 returns the device object 302*a* to the service processing module 3011.

The service processing module 3011 obtains the device object of the switching device 306 from the object obtaining module 3012 according to the device ID of the switching device 306. The object obtaining module 3012 requests the device object of the switching device 306 from the object storage module 3013 according to the device ID of the switching device 306. Because the switching device 306 is registered in the control device 304, the object storage module 3013 does not store the device object 306*a* of the switching device 306. The object storage module 3013 obtains location information of the switching device 306 from the shared device 307 according to the device ID of the switching device 306. Because the shared device stores the control device 3074 and the device object 3076, and the control device 3074 records the device ID and the IP address of the control device 304, the object storage module 3013 obtains the device ID and the IP address of the control device 304 according to the device ID of the switching device 306, and sends the device ID and the IP address of the control device 304 to the object obtaining module 3012.

It should be noted that, when creating the device object of the switching device 306, the object storage module 3043 may register a remote object of the switching device 306 in the object storage module 3043 (for example, a remote object service or remote method invocation (RMI) Server) for the switching device 306.

The object obtaining module 3012 initiates a remote object obtaining request (for example, accesses the RMI Server) according to the obtained device ID and IP address of the control device 304, so as to obtain remote object information of the switching device 306.

The object obtaining module 3012 establishes a remote object proxy of the switching device 306 according to the remote object information of the switching device 306. The service processing module 3011 can perform control or an operation for the switching device 306 using the remote object proxy, and a result of the control or operation may be transferred to the switching device 306 via a network, so as to implement control over the switching device 306.

After establishing the remote object proxy 306, the object obtaining module 3012 may directly perform an operation for the remote object proxy 306, and an operation manner thereof is the same as that of the service processing module 3011 for the device object of the switching device 302, except the result of the control or operation for the remote object proxy 306 is transferred to the switching device 306 via the network.

The foregoing embodiment is described using an example of establishing the remote object of the switching device 306, and for the control device 304 that further includes other controlled network devices, for example, a gateway or a router registered in the control device 304, the implementation manner of the network devices is similar to that of the switching device 306, and details are not described again.

The service processing module 3011 may control the device object of the switching device 302 through an operation interface. The interface is a set of methods, but only defines methods and does not make implementations. The device object may implement the interface, that is, the device object may implement the methods defined by the interface. In this way, the device may be controlled by setting the operation interface.

Figure 5:
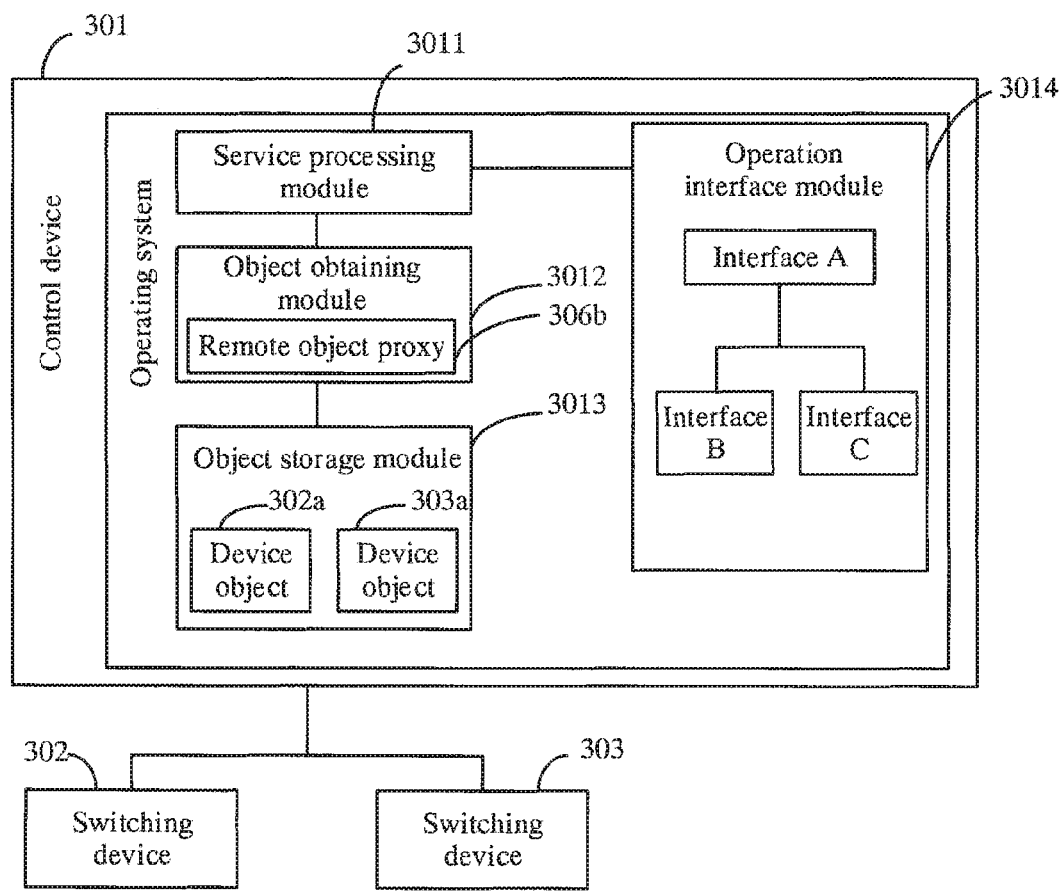
FIG. 5 is a schematic structural diagram of a further specific implementation manner of a control device in an SDN according to an embodiment of the present invention.

FIG. 5 is a schematic structural diagram of a further specific implementation manner of a control device in an SDN according to an embodiment of the present invention. As shown in FIG. 5, the control device 301 further includes an operation interface module 3014, which is configured to set at least two operation interfaces. For example, an interface A may be set, and the interface A includes operations supported by both the switching devices 302 and 303, for example, creating a link. Both the switching device 302 and the switching device 303 support the operation of creating a link. In addition, an interface B is set for the switching device 302, and the interface B inherits a method defined by the interface A, and adds a method only supported by the switching device 302, for example, adding a virtual port. That is, the interface B includes methods of creating a link and adding a virtual port. Further, an interface C is set, and the interface C also inherits the method defined by the interface A, and implements a method only supported by the switching device 303, for example, adding a Trunk port. That is, the interface C includes methods of creating a link and adding a Trunk.

In this way, the switching device 302 may implement the interface A and the interface B, and the switching device 303 may implement the interface A and the interface C. When the service processing module 3011 needs to perform an operation for the device object of the switching device 302, the service processing module 3011 may call the interface A or the interface B, and execute the method set by the interface A or the interface B, so as to implement control over the switching device 302. For example, when the link between the switching device 302 and the switching device 306 is being established, because the interface A sets the method for creating a link, the service processing module 3011 uses the interface A separately for the device object 302a of the switching device 302 and the remote object proxy 306b of the switching device 306 in establishment of the link between the switching device 302 and the switching device 306, that is, implements the method set by the interface A, so as to implement control over the establishment of the link between the switching device 302 and the switching device 306.

Figure 6:
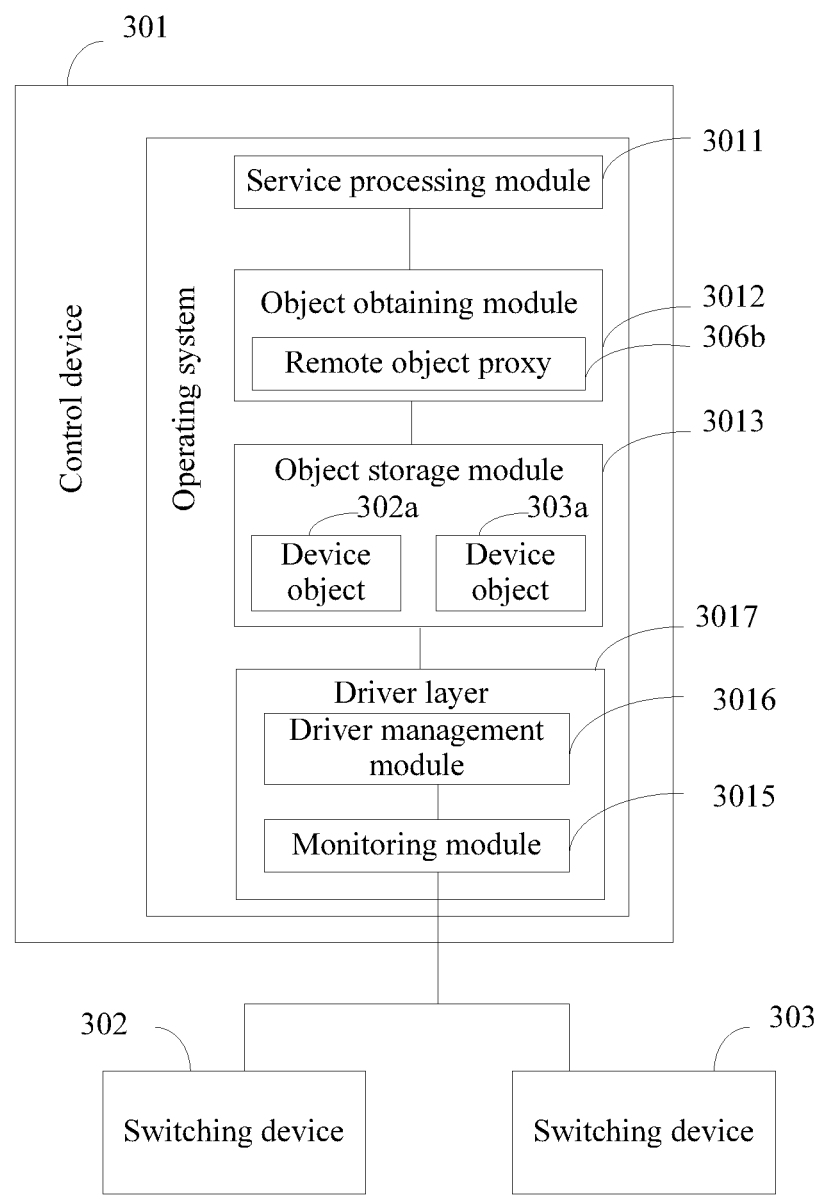
FIG. 6 is a schematic structural diagram of another further specific implementation manner of a control device in an SDN according to an embodiment of the present invention.

FIG. 6 is a schematic structural diagram of another further specific implementation manner of a control device in an SDN according to an embodiment of the present invention. As shown in FIG. 6, the operating system of the control device 301 further includes a driver layer 3017, and the driver layer is connected to the object storage module. In the embodiment of the present invention, the driver layer 3017 includes a monitoring module 3015 and a driver management module 3016.

The driver layer 3017 is responsible for communicating with devices and creating a device object of the network device that initiates registration. For example, when the switching device 302 registers with the control device 301, the driver layer 3017 creates the device object 302a for the switching device 302, and when the switching device 303 registers with the control device 301, the driver layer 3017 creates the device object 303a for the switching device 303. After finishing creating the device objects, the driver layer 3017 registers the created device objects in the object storage module 3013.

The driver management module 3016 is configured to store driver registration information of the switching device 302 and the switching device 303, and manage drivers of the switching device 302 and the switching device 303, for example, loading, unloading, or starting the switching devices.

The monitoring module 3015, as a centralized monitoring port, monitors a connection request of a network device. Request information sent by the switching device 302 or the switching device 303 may reach the monitoring module 3015 first, and the monitoring module 3015 sends the request information to the driver management module.

Because port numbers of the switching device 302 and the switching device 303 may conflict, that is, a situation where two port numbers are the same may occur, the driver management module 3106 cannot identify specific switching devices. Therefore, when the switching device initiates registration, it is necessary to carry feature codes that can uniquely identify the switching devices. Using the feature codes, the driver management module 3106 can identify different switching devices, and can also distinguish different switching devices even though the port numbers of the switching devices are the same. For example, in a situation where the port numbers of the switching device 302 and the switching device 303 are the same, the switching device 302 and the switching device 303 can be identified using the feature codes. The port numbers are port numbers of connections of the switching devices, and the feature codes are information carried by the switching devices when initiating registration requests, and the information can uniquely identify devices that initiate the registration requests. A request sent during the connection carries the information that uniquely identifies the switching device.

For example, it is assumed that a port number of the switching device 302 is 6633, and a feature code carried by the switching device 302 when initiating a registration request is 0xFF32; and that a port number of the switching device 303 is 831, and a feature code carried by the switching device 303 when initiating a registration request is 0xBB12, driver information recorded in the driver management module 3106 after the switching device 302 and the switching device 303 are registered is shown in Table 1:

TABLE 1

| Serial number | Port number | Feature code | Driver file | Protocol component |
|---|---|---|---|---|
| 1 | 6633 | 0xFF32 | Drivers/ovs.jar | Openflow.jar |
| 2 | 831 | 0xBB12 | Drivers/switch2.jar | Netconf.jar |

The foregoing feature code may be formed by at least one of a product number, a version number, and a producer number of the device, and is used to uniquely identify the switching device.

After the switching device 302 is registered, and when a connection request is initiated, the connection request may carry the feature code 0xFF32. The monitoring module 3015 receives the connection request of the switching device 302, and sends the connection request to the driver management module 3016. The driver management module 3016 obtains a driver of the switching device 302 according to the feature code carried in the connection request. Therefore, the driver management module 3016 can uniquely determine the switching device 302, and implement effective control of the operating system of the control device 301 over the switching device 302. Similarly, the process of the switching device 303 when initiating a connection request is similar to that of the switching device 302, and details are not described again.

Figure 7:
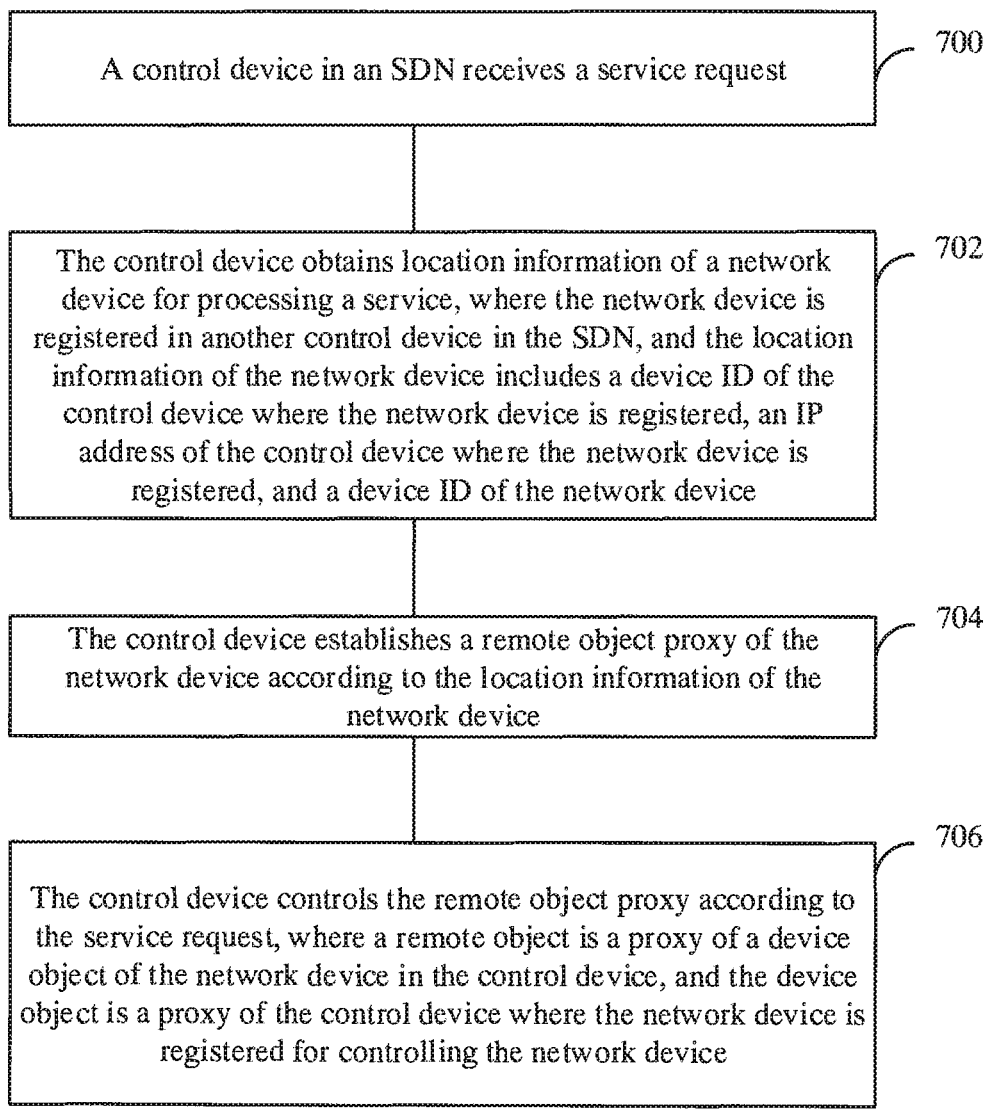
FIG. 7 is a schematic flowchart of a control method in an SDN according to an embodiment of the present invention.

FIG. 7 is a schematic flowchart of a control method in an SDN according to an embodiment of the present invention, where the method includes the following steps:

Step 700: A control device in an SDN receives a service request.

Step 702: The control device obtains location information of a network device for processing a service, where the network device is registered in another control device in the SDN, and the location information of the network device includes a device ID of the control device where the network device is registered, an IP address of the control device where the network device is registered, and a device ID of the network device.

Step 704: The control device establishes a remote object proxy of the network device according to the location information of the network device.

Step 706: The control device controls the remote object proxy according to the service request, where the remote object proxy is a proxy of a device object of the network device in the control device, and the device object is a proxy of the control device where the network device is registered for controlling the network device.

In the foregoing control method in the SDN provided by the embodiment of the present invention, location information of a network device registered in another control device in the SDN is obtained, so that a remote object proxy of the network device can be established according to the location information, and the network device is controlled using the remote object proxy. Using the foregoing method, the network device that needs to be controlled or operated and that is registered in another control device can be controlled directly, and it is unnecessary to send a control or operation request to device objects of all network devices in other control devices, thereby avoiding a step that the device objects of all the network devices in the other control devices receive a service control request and perform determining, and improving service processing performance.

As an optional implementation manner, the establishing a remote object proxy of the network device according to the location information of the network device includes obtaining remote object information of the network device according to the location information of the network device, and establishing the remote object proxy of the network device using the remote object information of the network device, where the remote object information of the network device is information of performing remote control over the network device. Further, the control device where the network device is registered may be determined according to the location information of the network device, and space that stores a remote object of the network device is accessible, and the remote object proxy of the network device is established according to the remote object information of the network device obtained from the space that stores the remote object of the network device, to implement remote control over the device object of the network device.

As an optional implementation manner, the method may further include sharing location information of a network device registered in the control device with other control devices in the SDN, where the location information of the network device registered in the control device includes a device ID of the control device, an IP address of the control device, and a device ID of the network device registered in the control device.

The sharing location information of a network device registered in the control device with other control devices in the SDN includes sending the location information of the network device registered in the control device to a shared device in the SDN, where the shared device stores location information of network devices in the SDN; or broadcasting the location information of the network device registered in the control device to the other control devices in the SDN. The shared device is an independent device, or is integrated in the control device, or is integrated in another control device in the SDN.

Correspondingly, the method further includes obtaining, from the shared device, location information of network devices registered in the other control devices in the SDN network, and storing the location information into an object storage module; or receiving the location information broadcast by the other control devices in the SDN, obtaining location information of network devices registered in the other control devices in the SDN network, and storing the location information into the object storage module.

Location information of a network device registered in the control device is shared with other control devices in the SDN, so that the other control devices in the SDN can obtain the location information of the network device registered in the control device, and so that the other control devices in the SDN can implement remote control over the registered control device according to the obtained location information. In addition, if the location information of the network device registered in the control device is sent to a shared device in the SDN, the control device in the SDN can obtain the location information from the shared device when remote control is required, so that space for the control device to store location information of the other control devices can be saved.

As an optional implementation manner, the method further includes creating at least two operation interfaces, where the at least two operation interfaces have an inheritance relationship in operation content, and the operation interfaces set operation manners for network devices registered in the control device. The at least two operation interfaces include an operation interface applicable to at least two network devices registered in the control device, and an operation interface only applicable to one network device registered in the control device.

At least two operation interfaces are set, and the operation interfaces have an inheritance relationship in operation content, a flexible configuration for the device object can be implemented, thereby avoiding a disadvantage that a method set by a single operation interface satisfies device objects of all network devices but fails to play properties of specific network devices, or a disadvantage, caused by a single operation interface setting an operation interface for a specific network device, that an implementation is complex and an operation interface is required to be added when a network device is newly added.

As an optional implementation manner, the method further includes setting a monitoring module in the control device, where the monitoring module receives a registration request initiated by the network device registered in the control device, where the registration request carries a feature code, and sending the feature code to a driver management module in the control device, where the feature code is used to uniquely identify the network device that initiates the registration request; and establishing, by the driver management module, according to the feature code, a mapping relationship between a driver of the network device registered in the control device and the feature code.

In addition, the monitoring module may further receive a connection request initiated by the network device registered in the control device, where the connection request carries the feature code; and the driver management module obtains, according to the feature code carried in the connection request, the driver of the network device registered in the control device. The feature code includes at least one of a product number, a version number, or a producer number of the network device.

In the foregoing method, the monitoring module acts as a bridge between the network device and the driver management module, and different network devices are distinguished using feature codes that uniquely identify the network devices, thereby implementing effective control over the network device, and avoiding a problem of failing to distinguish specific network devices because of repeated port numbers when port numbers are used to distinguish different network devices.

Reference may be made to the implementation manners of the control devices in the embodiments of FIG. 3 to FIG. 6 for the specific implementation manner of the foregoing method, and details are not described again.

An embodiment of the present invention further provides a processor in an SDN, where the processor is located in a control device in the SDN, and the processor is configured to perform the following steps: receiving a service request; obtaining location information of a network device for processing a service, where the network device is registered in another control device in the SDN, and the location information of the network device includes a device ID of the control device where the network device is registered, an IP address of the control device where the network device is registered, and a device ID of the network device; establishing a remote object proxy of the network device according to the location information of the network device; and controlling the remote object proxy according to the service request, where a remote object is a proxy of a device object of the network device in the control device, and the device object is a proxy of the control device where the network device is registered for controlling the network device.

In the processor in the SDN provided by the embodiment of the present invention, location information of a network device registered in another control device in the SDN is obtained, so that a remote object proxy of the network device can be established according to the location information, and the network device is controlled using the remote object proxy. Using the foregoing method, the network device that needs to be controlled or operated and that is registered in another control device can be controlled directly, and it is unnecessary to send a control or operation request to device objects of all network devices in other control devices, thereby avoiding a step that the device objects of all the network devices in the other control devices receive a service control request and perform determining, and improving service processing performance.

As an optional implementation manner, the establishing a remote object proxy of the network device according to the location information of the network device includes obtaining remote object information of the network device according to the location information of the network device, and establishing the remote object proxy of the network device using the remote object information of the network device, where the remote object information of the network device is information of performing remote control over the network device. Further, the control device where the network device is registered may be determined according to the location information of the network device, and space that stores a remote object of the network device is accessible, and the remote object proxy of the network device is established according to the remote object information of the network device obtained from the space that stores the remote object of the network device, to implement remote control over the device object of the network device.

As an optional implementation manner, the processor is further configured to perform the following step: sharing location information of a network device registered in the control device with other control devices in the SDN, where the location information of the network device registered in the control device includes a device ID of the control device, an IP address of the control device, and a device ID of the network device registered in the control device.

The sharing location information of a network device registered in the control device with other control devices in the SDN includes sending the location information of the network device registered in the control device to a shared device in the SDN, where the shared device stores location information of network devices in the SDN; or broadcasting the location information of the network device registered in the control device to the other control devices in the SDN. The shared device is an independent device, or is integrated in the control device, or is integrated in another control device in the SDN.

Correspondingly, the processor is further configured to process the following step: obtaining, from the shared device, location information of network devices registered in the other control devices in the SDN network, and storing the location information into an object storage module; or receiving the location information broadcast by the other control devices in the SDN, obtaining location information of network devices registered in the other control devices in the SDN network, and storing the location information into the object storage module.

Location information of a network device registered in the control device is shared with other control devices in the SDN, so that the other control devices in the SDN can obtain the location information of the network device registered in the control device, and so that the other control devices in the SDN can implement remote control over the registered control device according to the obtained location information. In addition, if the location information of the network device registered in the control device is sent to a shared device in the SDN, the control device in the SDN can obtain the location information from the shared device when remote control is required, so that space for the control device to store location information of the other control devices can be saved.

As an optional implementation manner, the processor is further configured to perform the following step: creating at least two operation interfaces, where the at least two operation interfaces have an inheritance relationship in operation content, and the operation interfaces set operation manners for network devices registered in the control device. The at least two operation interfaces include an operation interface applicable to at least two network devices registered in the control device, and an operation interface only applicable to one network device registered in the control device.

At least two operation interfaces are set, and the operation interfaces have an inheritance relationship in operation content, a flexible configuration for the device object can be implemented, thereby avoiding a disadvantage that a method set by a single operation interface satisfies device objects of all network devices but fails to play properties of specific network devices, or a disadvantage, caused by a single operation interface setting an operation interface for a specific network device, that an implementation is complex and an operation interface is required to be added when a network device is newly added.

As an optional implementation manner, the processor is further configured to perform the following steps: receiving a registration request initiated by the network device registered in the control device, where the registration request carries a feature code, and the feature code is used to uniquely identify the network device that initiates the registration request; establishing a mapping relationship between a driver of the network device registered in the control device and the feature code; receiving a connection request initiated by the network device registered in the control device, where the connection request carries the feature code; and obtaining, according to the feature code carried in the connection request, the driver of the network device registered in the control device.

The feature code includes at least one of a product number, a version number, or a producer number of the network device.

The foregoing processor distinguishes different network devices using feature codes that uniquely identify the network devices, thereby implementing effective control over the network device, and avoiding a problem of failing to distinguish specific network devices because of repeated port numbers when port numbers are used to distinguish different network devices.

Reference may further be made to the implementation manners of the control devices in the embodiments of FIG. 3 to FIG. 6 for the specific implementation manner of the foregoing processor, and details are not described again.

An embodiment of the present invention further provides a computer program product, where the computer program product can perform the steps listed in the foregoing embodiment of the control method in an SDN, and implement a technical effect achieved by the foregoing control method.

A person of ordinary skill in the art may be aware that, in combination with the examples described in the embodiments disclosed in this specification, units and algorithm steps may be implemented by electronic hardware, computer software, or a combination thereof. To clearly describe the interchangeability between the hardware and the software, the foregoing has generally described compositions and steps of each example according to functions. Whether the functions are performed by hardware or software depends on particular applications and design constraint conditions of the technical solutions. A person skilled in the art may use different methods to implement the described functions for each particular application, but it should not be considered that the implementation goes beyond the scope of the present invention.

It may be clearly understood by a person skilled in the art that, for the purpose of convenient and brief description, for a detailed working process of the foregoing system, apparatus, and unit, reference may be made to a corresponding process in the foregoing method embodiments, and details are not described herein again.

In the several embodiments provided in the present application, it should be understood that the disclosed system, apparatus, and method may be implemented in other manners. For example, the described apparatus embodiment is merely exemplary. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. A part or all of the units may be selected according to actual needs to achieve the objectives of the solutions of the embodiments of the present invention.

In addition, functional units in the embodiments of the present invention may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of the present invention essentially, or the part contributing to the prior art, or all or a part of the technical solutions may be implemented in the form of a software product. The software product is stored in a storage medium and includes several instructions for instructing a computer device (which may be a personal computer, a server, a network device, or the like) to perform all or a part of the steps of the methods described in the embodiments of the present invention. The foregoing storage medium includes any medium that can store program code, such as a Universal Serial Bus (USB) flash drive, a removable hard disk, a read-only memory (ROM), a random access memory (RAM), a magnetic disk, or an optical disc.

The foregoing descriptions are merely specific embodiments of the present invention, but are not intended to limit the protection scope of the present invention. Any modification or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. A first control device in a software defined network (SDN)-based computerized content distribution system, wherein the SDN-based computerized content distribution system comprises at least two control devices, the first control device comprising:
  a non-transitory memory configured to store computer executable program codes; and
  a computer processor configured to execute the computer executable program codes, wherein executing the computer executable program codes causes the computer processor to be configured to:
    obtain location information of a requested network device from a shared device, wherein the requested network device is registered in a second control device in the SDN-based computerized content distribution system, wherein the shared device stores location information of each network device in the SDN-based computerized content distribution system, and wherein the location information stored in the shared device is registered by a controlling control device of the network device;
    establish, according to the location information of the requested network device, a remote object proxy of the requested network device in the first control device; and
    control the requested network device using the remote object proxy established in the first control device,
  wherein the location information of the requested network device comprises a device identity (ID) of the second control device where the requested network device is registered, an Internet Protocol (IP) address of the second control device where the requested network device is registered, and a device ID of the requested network device.

2. The first control device in the SDN-based computerized content distribution system according to claim 1, wherein the computer processor is configured to:
   initiate a remote object obtaining request according to the device ID of the requested network device and the IP address of the second control device;
   obtain remote object information of the requested network device; and
   establish the remote object proxy of the requested network device according to the remote object information of the requested network device.

3. The first control device in the SDN-based computerized content distribution system according to claim 1, wherein the computer processor is further configured to create at least two operation interfaces for network devices registered in the first control device, and wherein the at least two operation interfaces have an inheritance relationship in operation content.

4. The first control device in the SDN-based computerized content distribution system according to claim 3, wherein the at least two operation interfaces created by the computer processor comprise an operation interface applicable to at least two network devices registered in the first control device and an operation interface only applicable to one network device registered in the first control device.

5. The first control device in the SDN-based computerized content distribution system according to claim 4, wherein the operation interfaces set operation manners for the network devices registered in the first control device.

6. The first control device in the SDN-based computerized content distribution system according to claim 1, wherein the computer processor is further configured to:
   receive a registration request initiated by a network device registered in the first control device, wherein the registration request carries a feature code, wherein the feature code is used to uniquely identify the network device that initiates the registration request; and
   establish, according to the feature code, a mapping relationship between a driver of the network device registered in the first control device and the feature code.

7. The first control device in the SDN-based computerized content distribution system according to claim 6, wherein the computer processor is further configured to:
   receive a connection request initiated by the network device registered in the first control device, wherein the connection request carries the feature code; and
   obtain, according to the feature code carried in the connection request, the driver of the network device registered in the first control device.

8. The first control device in the SDN-based computerized content distribution system according to claim 6, wherein the feature code comprises at least one of a product number, a version number, or a producer number of the network device.

9. A control method in a software defined network (SDN)-based computerized content distribution system comprising:
   receiving, by a first control device in the SDN-based computerized content distribution system, a service request, wherein the first control device comprises:
      a non-transitory memory configured to store an operating system; and
      a processor configured to execute the operating system stored in the non-transitory memory;
   obtaining, by the first control device, location information of a requested network device for processing a service from a shared device, wherein the requested network device is registered in a second control device in the SDN-based computerized content distribution system, wherein the shared device stores location information of each network device in the SDN-based computerized content distribution system, wherein the location information stored in the shared device is registered by a controlling control device of the network device, and wherein the location information of the requested network device comprises a device identity (ID) of the second control device where the requested network device is registered, an Internet Protocol (IP) address of the second control device where the requested network device is registered, and a device ID of the requested network device;
   establishing, by the first control device, a remote object proxy of the requested network device in the first control device according to the location information of the requested network device; and
   controlling, by the first control device, the requested network device using the remote object proxy established in the first control device.

10. The control method in the SDN-based computerized content distribution system according to claim 9, wherein establishing the remote object proxy of the requested network device in the first control device according to the location information of the requested network device comprises:
   initiating a remote object obtaining request according to the device ID of the requested network device and the IP address of the second control device;
   obtaining remote object information of the requested network device; and
   establishing the remote object proxy of the requested network device according to the remote object information of the requested network device.

11. The control method in the SDN-based computerized content distribution system according to claim 9 further comprising creating at least two operation interfaces, wherein the at least two operation interfaces have an inheritance relationship in operation content, and wherein the operation interfaces set operation manners for network devices registered in the first control device.

12. The control method in the SDN-based computerized content distribution system according to claim 11, wherein the at least two operation interfaces comprise an operation interface applicable to at least two network devices registered in the first control device and an operation interface only applicable to one network device registered in the first control device.

13. The control method in the SDN-based computerized content distribution system according to claim 9 further comprising:
   receiving a registration request initiated by a network device registered in the first control device, wherein the registration request carries a feature code, wherein the feature code is used to uniquely identify the network device that initiates the registration request; and
   establishing, according to the feature code, a mapping relationship between a driver of the network device registered in the first control device and the feature code.

14. The control method in the SDN-based computerized content distribution system according to claim 13 further comprising:

receiving, a connection request initiated by the network device registered in the first control device, wherein the connection request carries the feature code; and obtaining, according to the feature code carried in the connection request, the driver of the network device registered in the first control device.

15. The control method in the SDN-based computerized content distribution system according to claim 13, wherein the feature code comprises at least one of a product number, a version number, or a producer number of the network device.

* * * * *